United States Patent
Jiang et al.

(10) Patent No.: US 12,552,909 B2
(45) Date of Patent: Feb. 17, 2026

(54) PHOTONIC CRYSTAL MICROPATTERNS AND ANTI-COUNTERFEITING FILMS, METHODS OF MAKING, AND METHODS OF USE

(71) Applicant: University of Florida Research Foundation, Inc., Gainesville, FL (US)

(72) Inventors: Peng Jiang, Gainesville, FL (US); Calen Leverant, Gainesville, FL (US); Yifan Zhang, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 650 days.

(21) Appl. No.: 17/926,776

(22) PCT Filed: May 27, 2021

(86) PCT No.: PCT/US2021/034390
§ 371 (c)(1),
(2) Date: Nov. 21, 2022

(87) PCT Pub. No.: WO2021/247344
PCT Pub. Date: Dec. 9, 2021

(65) Prior Publication Data
US 2023/0203264 A1 Jun. 29, 2023

Related U.S. Application Data

(60) Provisional application No. 63/032,835, filed on Jun. 1, 2020.

(51) Int. Cl.
*C08J 9/26* (2006.01)
*B42D 25/36* (2014.01)
(Continued)

(52) U.S. Cl.
CPC ............... *C08J 9/26* (2013.01); *B42D 25/36* (2014.10); *C08F 222/102* (2020.02); *C08J 9/36* (2013.01);
(Continued)

(58) Field of Classification Search
CPC ........ B42D 25/36; C08F 2/50; C08F 222/102; C08F 222/103; C08J 2201/044;
(Continued)

(56) References Cited

U.S. PATENT DOCUMENTS

2013/0039094 A1 2/2013 Kolb et al.
2016/0326334 A1 11/2016 Jiang et al.
(Continued)

FOREIGN PATENT DOCUMENTS

WO 2020027871 A2 2/2020

OTHER PUBLICATIONS

ISR Mailed Oct. 4, 2021, International Application PCT/US2021/034390 filed on May 27, 2021; p. 1-17.

*Primary Examiner* — Lawrence D Ferguson
(74) *Attorney, Agent, or Firm* — Thomas Horstemeyer LLP.

(57) ABSTRACT

Provided herein are methods for fabricating a porous polymer material, methods for revealing hidden anti-counterfeiting patterns, chromogenic sensors having hidden anti-counterfeiting patterns, and the like. Chromogenic sensors including porous polymer materials are provided. The chromogenic sensors can reveal hidden patterns such as anti-counterfeiting patterns and the pattern can be re-hidden.

8 Claims, 3 Drawing Sheets

(51) Int. Cl.
  *C08F 222/10* (2006.01)
  *C08J 9/36* (2006.01)
  *G01N 21/78* (2006.01)

(52) U.S. Cl.
  CPC ........ *G01N 21/78* (2013.01); *C08J 2201/044* (2013.01); *C08J 2201/0462* (2013.01); *C08J 2335/02* (2013.01)

(58) Field of Classification Search
  CPC ............ C08J 2201/0462; C08J 2333/04; C08J 2335/02; C08J 9/26; C08J 9/36; C08L 75/16; G01N 21/78; G07D 7/14
  See application file for complete search history.

(56) References Cited

U.S. PATENT DOCUMENTS

| | | |
|---|---|---|
| 2017/0028763 A1 | 2/2017 | Arsenault et al. |
| 2018/0259403 A1 | 9/2018 | Patel |

PHOTONIC CRYSTAL MICROPATTERNS AND ANTI-COUNTERFEITING FILMS, METHODS OF MAKING, AND METHODS OF USE

CROSS-REFERENCE TO RELATED APPLICATIONS

This application claims the benefit of and priority to U.S. Provisional Application Ser. No. 63/032,835, having the title "PHOTONIC CRYSTAL MICROPATTERNS AND ANTI-COUNTERFEITING FILMS, METHODS OF MAKING, AND METHODS OF USE", filed on Jun. 1, 2020.

STATEMENT REGARDING FEDERALLY SPONSORED RESEARCH OR DEVELOPMENT

This application is the 35 U.S.C. § 371 national stage of PCT application having serial number PCT/US2021/034390, filed on May 27, 2021. This application also claims priority to U.S. provisional application entitled "PHOTONIC CRYSTAL MICROPATTERNS AND ANTI-COUNTERFEITING FILMS, METHODS OF MAKING, AND METHODS OF USE," having Ser. No. 63/032,835 filed on Jun. 1, 2020, which are entirely incorporated herein by reference.

BACKGROUND

Counterfeit products are a costly issue. Reconfigurable chromogenic sensors that can be used to reveal hidden patterns as anti-counterfeiting measures are needed. These needs and other needs are satisfied by the present disclosure.

SUMMARY

Embodiments of the present disclosure provide for methods for fabricating a porous polymer material, methods for revealing hidden anti-counterfeiting patterns, chromogenic sensors having hidden anti-counterfeiting patterns, and the like.

An embodiment of the present disclosure includes a method for fabricating a porous polymer material. The method can include providing a plurality of particles in a volume between a first surface of a first substrate and at least one opposing second surface of a second substrate, wherein the plurality of particles includes an ordered array of nanoparticles. A shape memory polymerizable material can be added into the volume between the opposing first and second surfaces to surround the particles. The shape memory polymerizable material can be polymerized to form a polymer framework around the particles. The particles can then be removed to form an ordered array of voids in the polymer framework. The porous polymer material can be transitioned to a deformed state in which the array of voids is in a collapsed state by applying a first stimulus and/or applying a vertical force, causing the voids to collapse. A mask can be placed over the porous polymer material to form masked regions and exposed regions. The porous polymer material can be exposed to UV radiation, causing the voids in the exposed regions to remain permanently in the collapsed state. The collapsed voids in the masked regions can be recovered back to the ordered state by applying a second stimulus, revealing the hidden anti-counterfeiting patterns.

An embodiment of the present disclosure also includes a method of revealing a hidden anti-counterfeiting pattern that includes: contacting a chromogenic sensor with a trigger solvent, causing the chromogenic sensor to reveal the hidden anti-counterfeiting pattern. The chromogenic sensor can include a porous polymer material comprising an ordered array of voids separated by a polymer framework. The porous polymer material can have a first region having the hidden anti-counterfeiting pattern and a second region. The first region of the porous polymer material can have a deformed state and a recovered state. When in the deformed state, the voids are collapsed and the first region has a characteristic of being substantially transparent. When the first region of the porous polymer material is in the recovered state, the voids are uncollapsed and the first region has a characteristic of having an iridescent color. The second region has been exposed to UV radiation during a programming step, thereby causing the voids of the second region to irreversibly remain in a collapsed state and has a characteristic of remaining transparent. The hidden anti-counterfeiting pattern is not visible when the first region is in a deformed state since both the first and second regions have the characteristic of being substantially transparent. Contacting the chromogenic sensor can occur when the first region is in a deformed state, and the contacting causes the first region of the porous polymer material to return to a recovered state thereby revealing the anti-counterfeiting pattern.

An embodiment of the present disclosure also includes chromogenic sensor having a hidden anti-counterfeiting pattern. The chromogenic sensor can include a porous polymer material comprising an ordered array of voids separated by a polymer framework. The porous polymer material can have a first region having the hidden anti-counterfeiting pattern and a second region. The first region of the porous polymer material can have a deformed state and a recovered state. When the first region is in the deformed state, the voids are collapsed and the first region has a characteristic of being substantially transparent, and when the first region is in the recovered state, the voids are uncollapsed and the first region has a characteristic of having an iridescent color. The voids of the second region can irreversibly remain in a collapsed state and has a characteristic of remaining transparent due to having been exposed a programming step. The hidden anti-counterfeiting pattern is not visible when the first region is in a deformed state since both the first and second regions have the characteristic of being substantially transparent. When the first region is in a deformed state, contacting the chromogenic sensor with a trigger solvent causes the first region of the porous polymer material to be in the recovery state thereby revealing the anti-counterfeiting pattern.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1A) after submersion in water and FIG. 1B) after exposure to ethanol vapor.

FIGS. 3A, 3B, and 3C correspond to a UV masked region, an exposed region, and the boundary between regions, respectively.

Figures 1A, 1B:
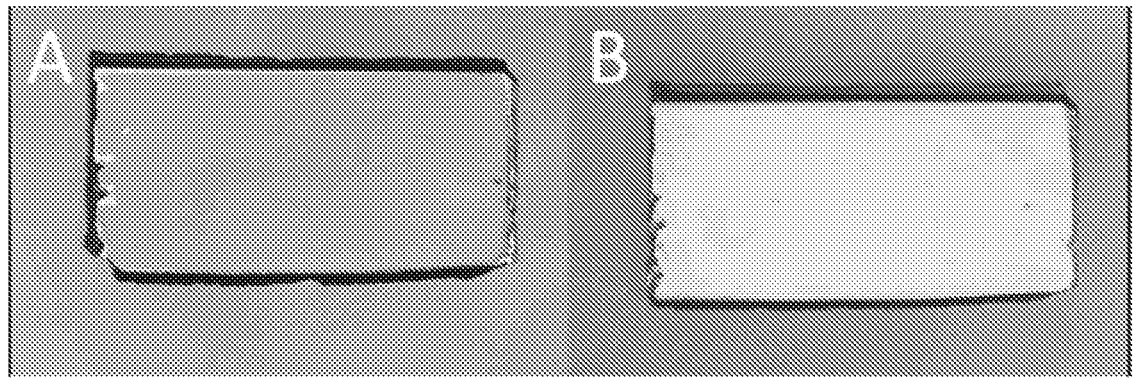
FIGS. 1A-1B are camera images of microporous shape memory polymer film according to embodiments of the present disclosure.

The drawings illustrate only example embodiments and are therefore not to be considered limiting of the scope described herein, as other equally effective embodiments are within the scope and spirit of this disclosure.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

General Discussion

In accordance with the purpose(s) of the present disclosure, as embodied and broadly described herein, embodiments of the present disclosure, in some aspects, relate to materials, sensors, methods of making materials and sensors, and methods of use, wherein the materials can function as sensors for various stimuli (e.g., chemical, temperature, mechanical stress, laser, microwave, etc. In an embodiment, substrates of the present disclosure can reversibly change coloration based upon interaction with stimuli.

In general, embodiments of the present disclosure provide for methods of fabricating a porous polymer material, methods of revealing hidden anti-counterfeiting patterns, porous polymer materials, micropatterned photonic crystal films, and products including chromogenic sensors.

The present disclosure includes a method for programming specific photonic crystal patterns into nanostructured shape memory polymer (SMP) films to form a porous polymer material. Advantageously, the method can be used to make films that can subsequently hide and reveal words, patterns, symbols, etc. The methods can be used in such as counterfeit detection or other applications in which revealing a hidden message or pattern may be desirable. The method can also be used to form materials that can be used in applications such as all-optical integrated circuits, optical interconnects, waveguides, low-threshold laser, optical filters, and many other optical devices that can benefit from switchable photonic crystals to effectively bend light with low optical losses.

In an embodiment, the method can result in macroporous photonic crystals with switchable structural color. In other embodiments, the methods can also be used to program nanoscale structures controlling disparate properties such as hydrophobicity and antireflection. Other advantages of embodiments of the present disclosure are that the process for making the porous polymer materials is simple, scalable, and inexpensive. In addition, embodiments of the present disclosure can be used in applications such as anti-counterfeiting, integrated optical devices, smart light regulation coatings, light energy detection, chemical detection, and the like.

In an embodiment, the method for fabricating the porous polymer material can include providing a plurality of particles in a volume between a first surface of a first substrate and at least one opposing second surface of a second substrate, wherein the plurality of particles includes an ordered array of nanoparticles. The nanoparticles can include silica, latex, or other nanoparticles as can be envisioned by one of ordinary skill in the art. A shape memory polymerizable material can be added into the volume between the surfaces to surround the particles. The shape memory polymerizable material can be polymerized to form a polymer framework around the particles. The particles can then be removed to form an ordered array of voids in the polymer framework. The porous polymer material can be transitioned to a deformed state (also referred to as a collapsed state) by applying a first stimulus and/or applying a vertical force, causing the voids to collapse.

In some embodiments, a mask can be placed over the porous polymer material to form masked regions and exposed regions, then the porous polymer material can be exposed to UV radiation, causing the exposed regions to remain permanently in the deformed state. Advantageously, this method does not require the addition of any filler polymers to fill voids in a region.

In some embodiments, after removing the mask, the porous polymer material can be rinsed with or submerged in water to return the exposed regions to a deformed state. The water can be evaporated to induce the collapse of the voids. The evaporation of water creates a large capillary pressure that is higher than the elastic modulus of the polymer, leading to the collapse of the voids. In some embodiments, the first stimulus mentioned above can be the capillary pressure generated by the evaporation of the water. In some embodiments, the porous polymer materials can be deformed by simply applying an external pressure at room temperature and/or at a temperature higher than the glass transition temperature of the polymer. The use of a mask can result in a finer, more detailed pattern of masked regions and exposed regions when compared to prior methods requiring a filler polymer. The method can further include exposing the porous polymer material to a trigger stimulus to return the masked regions to the recovered state. Advantageously, the switching can be performed repeatedly. The masked region can be switched to the deformed state or the recovered state repeatedly by exposing the masked region to water or trigger stimuli, respectively.

In some embodiments, the porous polymer material is a photonic crystal material having chromogenic properties. In other words, when the voids are in a deformed state they appear transparent, and when the voids are in a recovered (or uncollapsed) state they appear iridescent. Thus, the unmasked portions will remain transparent even when exposed to the trigger stimulus and the exposed regions will appear iridescent, allowing a pattern to become visible. In some embodiments, a background pattern and/or image on a substrate or backing sheet can be placed beneath the material so that it is visible when the voids are transparent. The background pattern and/or image can then be obscured or changed when selectively unmasked regions are exposed to the trigger stimulus.

In various embodiments the mask can include a material impenetrable to UV light. The mask can be made of such as a standard photomask with patterned chromium on a glass substrate or a transparency film with a printed feature on it to form the masked and unmasked regions.

In various embodiments, the trigger stimulus can be a solvent (e.g., hexane, acetone, ethanol, toluene) or vapors thereof. In other embodiments, the trigger stimulus can be a mechanical impact, an external pressure, a shear stress, heat, microwave radiation, an unreacted monomer, a small organic molecule, or a laser energy.

The shape memory polymerizable material can include thermoplastic polymer and/or thermoset polymers. In various embodiments, the shape memory polymerizable material can include polyethylene glycol (PEG), polyethylene, polyvinyl chloride (PVC), polyurethane, epoxy, polystyrene, polymethyl methacrylate (PMMA), polymethyl acrylate (PMA), silicone rubber, polyolefins, polyesters, polyamides, polytetrafluoroethylene (PTFE), and the like. The shape memory polymerizable material can include a blend of polyurethane with PEG, polyurethane with polyacrylates, polyesters with epoxy, PEG with polyolefins, PMMA with PEG, PMA with PEG, ethoxylated trimethylolpropane triacrylate and polyethylene glycol diacrylate, a blend of an aliphatic polyester/polyether-based trifunctional urethane acrylate oligomer and blended with tripropylene glycol diacrylate, or combinations thereof.

In an embodiment, collapsed voids of the masked region can be returned to the recovery state by applying a trigger stimulus such as pressure. The voids of the unmasked region remain in the collapsed state even when the trigger stimulus is applied.

In an embodiment, collapsed voids of the masked region can be returned to the recovery state by applying a trigger stimulus such as a chemical stimulus such as an organic compound (e.g., a polymer (e.g., PDMS oligomers)) or solvent (e.g., ethanol, isopropanol, acetone, butanol, toluene, and a combination there). The voids of the unmasked region remain in the collapsed state even when the trigger stimulus is applied.

In an embodiment, the distance between at least two pairs of adjacent voids is substantially the same (e.g., about 100 nm to 1000 nm). In an embodiment, the number of unique pairs in a 1 cm×1 cm×10 µm sample can be about 10, 100, 1000, 10,000, 100,000, 1,000,000, 100,000,000, 100,000,000, to about 10, 100, 1000, 10,000, 100,000, 1,000,000, 100,000,000, 100,000,000, $1\times1010$, $1\times1012$, $1\times1015$, $1\times1017$, or $1\times1020$ and any set of ranges (e.g., about 10,000 to 100,000, about 100 to $1\times1010$, etc.) within these numbers or subranges (e.g., about 15 to 200,000, 2,500,000 to $3\times1012$, etc.) within these numbers.

In an embodiment, the distance between each pair of adjacent voids is substantially the same. In an embodiment, the distance between a portion of the pairs of adjacent voids is substantially the same. In an embodiment, the "portion" can be about 50% or more, about 60% or more, about 70% or more, about 80% or more, about 90% or more, about 99% or more, or about 100%, over a defined area of the porous polymer layer. In an embodiment, the defined area can include about 50% or more, about 60% or more, about 70% or more, about 80% or more, about 90% or more, about 95% or more, about 99% or more, or about 100%, of the area of the porous polymer layer. The term "substantially" in these contexts can mean about 50% or more, about 60% or more, about 70% or more, about 80% or more, about 90% or more, about 99% or more, or about 100%. The term "adjacent" refers to two voids next to one another without a void separating them in the same porous polymer material.

In an embodiment, a polymer framework separates the voids. In an embodiment, the diameter (or longest distance across the void) of substantially all of the voids can be substantially equivalent. In an embodiment, the diameter is about 0.03 micrometers to 10 micrometers. The term "substantially" in this context can mean about 50% or more, about 60% or more, about 70% or more, about 80% or more, about 90% or more, about 99% or more, or about 100%.

In an embodiment, the porous polymer material is formed by disposing particles (e.g., nanoparticles) onto a surface to form an array of particles. In an embodiment, a monomer mixture can be disposed on a surface using capillary forces (See Examples) or using a process such as a doctor blade coating process, tape casting, dip coating, or applying a simple shear force by two plates with a controlled gap in between. The particles can be aligned in a three-dimensionally ordered colloidal crystal array, e.g., the particles can be located in crystalline lattices of, for example, a face-centered cubic (f.c.c.), hexagonal-centered cubic (h.c.p.) crystals, randomly close-packed crystals, or the like. After the monomer mixture is disposed on the particle array, the monomer mixture can be polymerized to form a co-polymer membrane having particles disposed in the polymer membrane. In an embodiment, the polymerization can be photopolymerization, thermopolymerization, or a combination thereof.

Subsequently, a portion (e.g., about 50%, 60%, 60%, 80%, 90%, 95%, 99% or more, or about 100%) or all of the particles can be removed to form the porous polymer material. In an embodiment, the particles can be removed by a process that does not alter the polymer. The type of process used to remove the particles depends, at least in part, upon the type of nanoparticle and the polymer. In an embodiment, the porous polymer material is formed by dissolving the particles using an acid solution such as, but not limited to, hydrofluoric acid (e.g., for silica nanoparticles). The porous polymer material including an array of voids is formed once the particles are removed.

As mentioned above, the voids are made from the removal of one or more particles. In an embodiment, the particles are disposed on top of one another in the polymer membrane, and when the particles are removed, a void is formed in the place of each particle. In an embodiment, the voids are distinct from one another and in another embodiment the voids are interconnected to form interconnected volumes that can form channels within and/or through the porous polymer material.

In an embodiment the monomer mixture can include two or more acrylate monomers such as those described herein, where each monomer can be about 5 to 95 weight percent of the monomer mixture. In an embodiment the prepolymer mixture can include an ethoxylated trimethylolpropane triacrylate (ETPTA) and a polyethylene glycol diacrylate (PEGDA). In an embodiment, the volumetric ratio of ETPTA to PEGDA can be about 1:1 to 1:10 or about 1:2 to 1:6. In addition, the monomer mixture can include a polymer initiating agent such as a photoinitiator (e.g., 2-hydroxy-2-methyl-1-phenyl-1-propanone, azobisisobutyronitrile, or 2,2-dimethoxy-2-phenylacetophenone). The amount of initiator used depends upon the polymerization process, the monomers, and the like.

Once the monomer is polymerized, a polymer framework is formed around the particles. After the particles are removed, the polymer framework supports the porous polymer material. The mechanical characteristics of the polymer framework can be controlled by selection of the monomers, the ratio of the monomer, the amount of the initiator, and the like. The dimensions of the polymer framework can be controlled by the process of disposing the monomer/particle mixture on the substrate. In an embodiment, the thickness of the polymer framework between adjacent particles can be about 100 nm to 1000 nm.

In an embodiment, the particles can be of the same or different type and/or same or different size, depending on the use or purpose of the porous polymer material. The selection of the type particle can depend upon the process for removing the particle, the type of polymer, and/or polymer framework. In an aspect, the particles are nanoparticles. The selection of the size can depend upon the process for removing the nanoparticles, the type of polymer, the polymer framework, the diameter of the desired voids and channel, and the like. In an embodiment, two or more different types and/or sizes of nanoparticles can be selected. In an embodiment, two or more processes can be used to remove nanoparticles (e.g., when two or more types of nanoparticles are used in the monomer/nanoparticle mixture). The type of nanoparticle can include silica nanoparticles, polymer latex nanoparticles, titania nanoparticles, CdSe nanoparticles, Au nanoparticles, and other nanoparticles where the type selected has a uniform diameter. In an embodiment, the nanoparticles can have a diameter of about 100 to 1000 nm or about 200 to 500 nm.

In an embodiment, the nanoparticles can include latex and the trigger stimulus can be an organic solvent (e.g. ethanol, isopropanol, butanol, methanol, hexane, etc.).

Embodiments of the present disclosure include a method of revealing a hidden anti-counterfeiting pattern. A chromogenic sensor can be contacted with a trigger solvent, causing the chromogenic sensor to reveal the hidden anti-counterfeiting pattern. The chromogenic sensor includes a porous polymer material as above, wherein the hidden anti-counterfeiting pattern is not visible when the first region is in a deformed state since both the first and second regions have the characteristic of being transparent. When the first region is in a deformed state, when contacted by the trigger solvent, the first region of the porous polymer material will return to a recovery state thereby revealing the iridescent anti-counterfeiting pattern. The pattern can be concealed by exposing the material to water, thereby returning the material to the deformed state. The chromogenic sensor can be attached to an article or packaging.

In other embodiments, the materials can have switchable properties such as hydrophobicity and antireflection, rather than transparency. When the voids are in the deformed state, the transparent film exhibits lower water contact angle than that measured on the recovered sample with three-dimensionally ordered voids. Similarly, the deformed voids (for voids with diameter smaller than 200 nm) lead to a higher light reflection from the film surface compared with the recovered sample with ordered voids. The UV masking technology described herein is beneficial, allowing for easily defined regions with tunable wetting and antireflection properties.

In various embodiments, the porous polymer material is exposed to pulsed UV radiation for about 2 to 6 seconds, or about 4 seconds via a UV curing system. The wavelength of the UV curing system can be from about 180 nm to 365 nm with peak power of about 1000 W/cm$^2$.

Embodiments of the present disclosure also provide for porous polymer materials fabricated from the methods described above. In some embodiments, the porous polymer material has a thickness of about 1 micrometer to 1000 micrometers, or about 300 micrometers.

The present disclosure also provides for chromogenic sensors having a hidden anti-counterfeiting pattern, as described above.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Figures 1C, 1D:
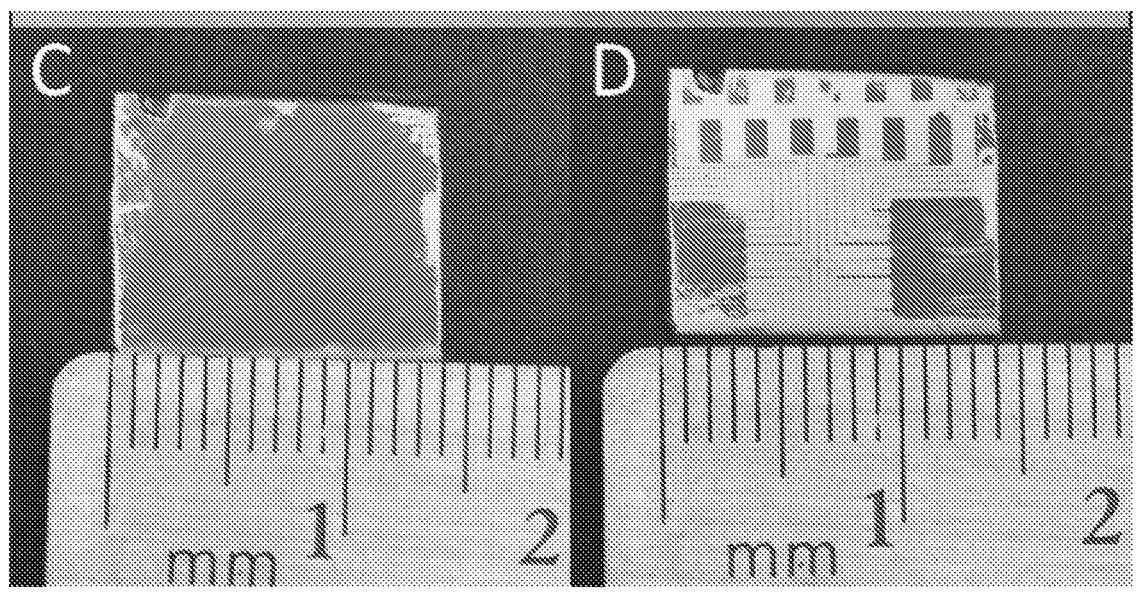
FIGS. 1C-1D are camera images of microporous shape memory polymer film according to embodiments of the present disclosure that were exposed to additional UV radiation through a mask (FIG. 1C) after submersion in water and (FIG. 1D) after exposure to ethanol vapor.

A nanoscale structure known as a microporous inverse opal film, which displays macroscopic structural color, is provided as a particular example herein. In previous work, we have shown that the nanoscale structure of these SMP films can be deformed and recovered using heat,[1] solvent,[2-4] and other stimuli.[5,6] FIG. 1A shows that after exposure to water, the SMP goes completely transparent and FIG. 1B shows the same film after exposure to ethanol which recovers the structural color. This process allows switching of the macroscopic properties of the entire film. In the methods described herein, exposing the SMP film to UV radiation while in the deformed state will make it unresponsive to stimuli that would previously recover the SMP nanostructure. By placing a mask between the UV radiation and the SMP film, regions of the film can be selectively chosen to deactivate. Exposing the deformed SMP film to UV radiations does not show any visible changes, leaving the sample transparent (FIG. 1C); however, after exposure to ethanol, only masked regions recover the iridescent structural color while the exposed regions stay transparent (FIG. 1D). This allows programming of invisible messages, patterns, or symbols into SMP films that can only be decoded by individuals who know how to trigger the recovery of the structural color. Optical features in FIG. 1D indicate that this method can program features significantly smaller than 1 mm.

Shape memory polymers are a class of "smart" materials that can memorize and recover their permanent shapes in response to an external stimulus, such as heat, light, solvent, electricity, and magnetic fields. Compared with their alloy counterparts (e.g., nitinol alloy), SMPs have gained increased attention due to their dramatically larger strain storage and recovery (up to 800% vs. less than 8%), low cost, light weight, ease of synthesis, and biocompatibility. Shape memory (SM) is typically achieved in a three-step process that includes programming, storage, and recovery. Programming involves deforming a sample from its permanent shape to a temporary shape. This is usually done above the polymer glass transition temperature ($T_g$) to take advantage of the compliant nature of SMPs at high temperature. Once the sample has been deformed, it is cooled below $T_g$ to "freeze" in the temporary shape, which is due to restricted polymer chain mobility. Recovery occurs when the sample is heated to the vicinity of $T_g$, which increases chain mobility and allows the polymer to return to its permanent shape via entropy elasticity.[6-9]

"Hot" programming (i.e., heating SMP above a transition temperature such as $T_g$ and then deforming to a temporary configuration) is generally utilized by almost every class of SMPs. By contrast, SMPs that can be "cold" programmed (i.e., programming at or below ambient temperature), which could provide a wide degree of processability to accommodate broader application requirements (e.g., operating at ambient conditions), are rare.

In the present disclosure, the porous polymer material (e.g., also referred to as the SMP photonic crystal membrane) includes an array of voids that are in a collapsed state (e.g., the volume of the void is reduced close to 0) or a disordered state (e.g., the voids are not highly ordered in three-dimension), and when a stimuli (e.g., light energy, pressure, or chemical) is applied to an area of the porous polymer material, the collapsed or disordered voids recover in that area return to their uncollapsed or highly ordered state or fully formed state (e.g., having maximum void volume).

In addition, in some embodiments, when the voids are in a collapsed state, the porous polymer material is substantially transparent (e.g., a pale white color) or transparent, or are non-iridescent (e.g. black or a dark color) while when the voids have recovered from the collapsed state, the porous polymer material has an iridescent color that can be tuned by altering the volume of the voids. In an aspect, the porous polymer material can include an additive such as graphene.

Experimental Procedure

Well-ordered silica colloidal crystal templates were created using the convective self-assembly method.[7] The colloidal crystal was placed between two microslides using 24 layers of double sized tape to control the thickness of the sandwich structure. An oligomer mixture of polyethylene glycol (600) diacrylate (SR610, Arkema) and ethoxylated (20) trimethylolpropane triacrylate (SR415, Arkema) was mixed with photoinitiator 2-hydroxy-2-methyl-1-phenyl-1-propanone (Darocur 1173, BASF). The oligomer mixture was added to the space between the microslides, penetrating the colloidal crystal due to the capillary force. The sandwich structure was placed in a pulsed UV curing system (RC 742, Xenon) for 4 s, resulting the free radical polymerization of the oligomer mixture. The polymer samples were removed from the sandwich structure and placed in hydrofluoric acid for 10 minutes to remove the colloidal crystal template. The final samples are SMP films with a templated microporous nanostructure and easily perceivable structural color.

The SMP film can be switched from iridescent to transparent by submersion in water and from transparent to iridescent by exposure to the liquid or vapor of swelling solvents (i.e. ethanol, acetone, hexane, etc.). The mechanism for this switchable color is ordering and disordering of the SMP nanostructure which we have previously reported.[4,5] Exposing the deformed SMP film to UV radiation, in the pulsed UV curing system, locks the SMP film in the transparent state. By placing a mask between the UV radiation and the SMP film, a pattern or message can be encoded in the SMP film. The hidden message is only visible once the SMP film is exposed to a swelling solvent liquid or vapor. After exposing the message, it can be hidden again by submerging the sample in water.

Figure 2A:
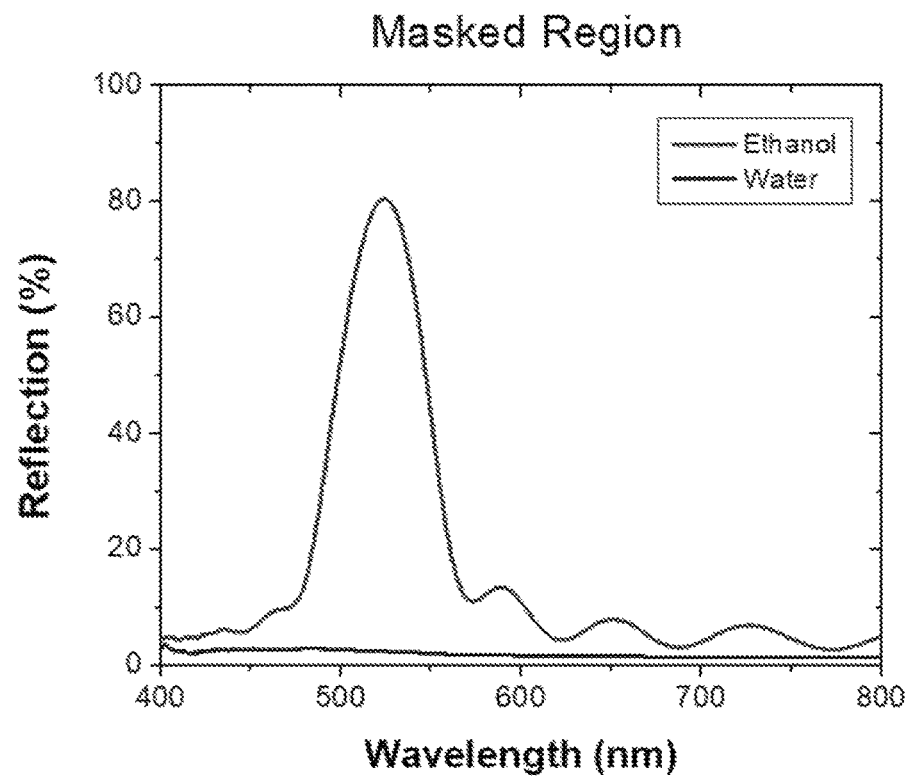
FIGS. 2A-2B show normal-incidence reflection spectra obtained from the shape memory polymer microporous membrane of (FIG. 2A) region masked from UV radiation exposure and (FIG. 2B) exposed to UV radiation, according to embodiments of the present disclosure.
Figure 2B:
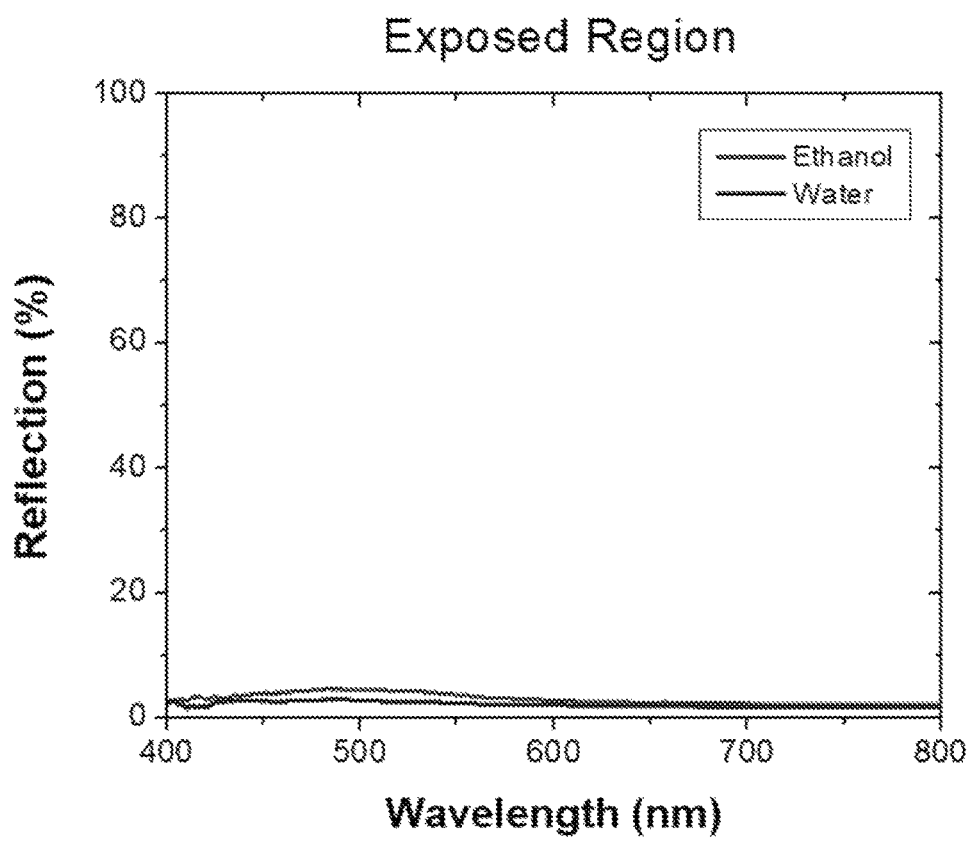

The optical reflection spectra of the exposed and masked regions of SMP film is compared in FIGS. 2A-2B, obtained using an Ocean Optics optical spectroscopy. The UV masked region is transparent after exposure to water with reflection across the entire visible spectrum less than 5% (FIG. 2A, blue line). After exposure to ethanol, the masked region becomes green with a photonic band gap reflecting ~80% of 535 nm light (FIG. 2A, red line). The UV exposed region stays nearly completely transparent after exposure to either ethanol or water (FIG. 2B).

Figure 3A:
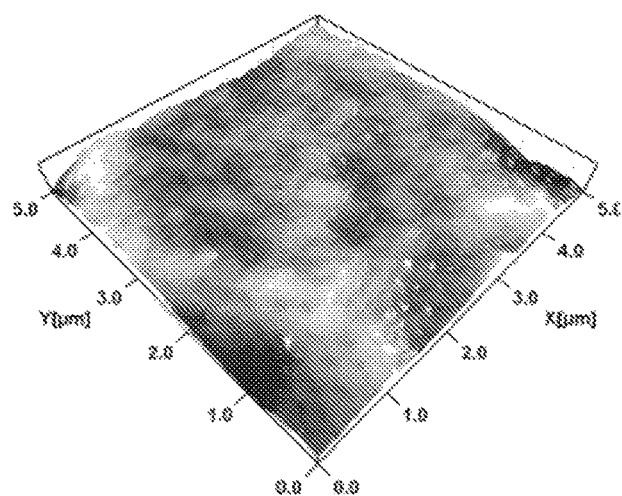
FIGS. 3A-3C provide atomic force microscopy images showing the surface structure of the SMP film after exposure to ethanol.
Figure 3B:
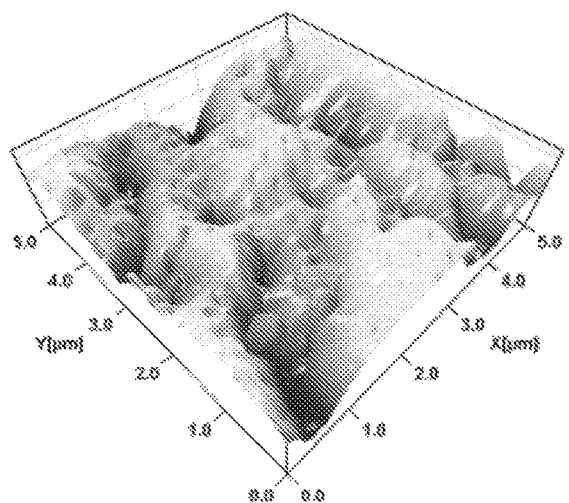
Figure 3C:
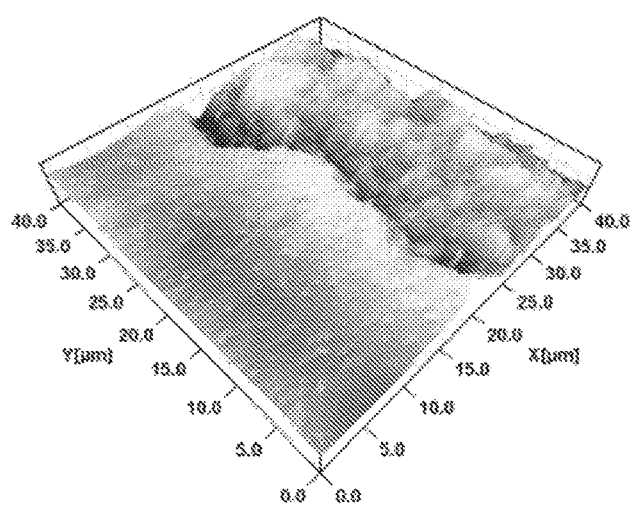

The surface structure of the SMP film after exposure to ethanol was examined using atomic force microscopy. FIGS. 3A, 3B, and 3C correspond to a UV masked region, an exposed region, and the boundary between regions. FIG. 3A shows that the masked has a smooth, ordered structure, while FIG. 3B shows the UV exposed region is significantly rougher with no apparent ordering. This is further evidence that UV exposure makes the SMP film unresponsive to stimuli that previously were used to recover the nanoscale ordering.

In previous solvent-responsive SMP films, the switching of nanoscale structure via water or ethanol exposure happened over the entire film. This limits the application of the films to sensor applications where precise control over certain regions of the sample are not necessary. Masked exposure to UV radiation allows for precise control over the nanostructure of local regions of the SMP film. Furthermore, while a photonic crystal membrane is shown as a specific example, this method can be generalized to other SMP nanostructures, thereby allowing for a cheap and scalable approach to pattern SMP films.

Aspects

The present disclosure can be described in accordance with the following numbered Aspects, which should not be confused with the claims.

Aspect 1. A method for fabricating a porous polymer material, comprising: providing a plurality of particles in a volume between a first surface of a first substrate and at least one opposing second surface of a second substrate, wherein the plurality of particles includes an ordered array of nanoparticles; adding a shape memory polymerizable material into the volume between the opposing first and second surfaces to surround the particles; polymerizing the shape memory polymerizable material to form a polymer framework around the particles; removing the particles to form an ordered array of voids in the polymer framework; transitioning the porous polymer material to a deformed state in which the array of voids is in a collapsed state by applying a first stimulus, causing the voids to collapse; placing a mask over the porous polymer material to form masked regions and exposed regions; and exposing the porous polymer material to UV radiation, causing the voids in the exposed regions to remain permanently in the collapsed state.

Aspect 2. The method of Aspect 1, further comprising: removing the mask; and wherein an entirety of the voids in the porous polymer material is in the collapsed state.

Aspect 3. The method of Aspect 2, further comprising: exposing the porous polymer material to a trigger stimulus to return the voids in the masked regions to an uncollapsed state.

Aspect 4. The method of Aspect 3, wherein the trigger stimulus is a solvent is selected from hexane, acetone, ethanol, toluene, or vapors thereof.

Aspect 5. The method of Aspect 3, further comprising exposing the porous polymer material to water to return the masked regions to the deformed state so that an entirety of the voids in the porous polymer material is in the collapsed state. At this stage, the method can begin again and the porous polymer material can be reused.

Aspect 6. The method of any of Aspects 1-5, wherein the particles are selected from silica nanoparticles, polymer latex nanoparticles, titania nanoparticles, CdSe nanoparticles, or Au nanoparticles.

Aspect 7. The method of any of aspects 3-6, wherein the plurality of particles comprise latex and the trigger stimulus is an organic solvent.

Aspect 8. The method of any of aspects 3-6, wherein the trigger stimulus is selected from: a solvent, a mechanical impact, an external pressure, a shear stress, heat, microwave radiation, an unreacted monomer, a small organic molecule, or a laser energy.

Aspect 9. The method of any of aspects 1-8, wherein the plurality of particles comprise silica; and wherein the shape memory polymerizable material comprises a blend of ethoxylated trimethylolpropane triacrylate and polyethylene glycol diacrylate, a blend of an aliphatic polyester/polyether-based trifunctional urethane acrylate oligomer and blended with tripropylene glycol diacrylate, or combinations thereof.

Aspect 10. The method of any of aspects 1-9, wherein the porous polymer material is a photonic crystal membrane, wherein when the voids in a region are in a collapsed state the region is substantially transparent, and wherein when the voids in a region are in an uncollapsed state the region has a non-transparent color.

Aspect 11. The method of any of aspects 3-10, wherein the voids in the masked region can be switched to the collapsed state or the uncollapsed state repeatedly by exposing the masked region to water or trigger solvent, respectively.

Aspect 12. The method of any of aspects 1-11, wherein the exposing the porous polymer material further comprises exposing the porous polymer material to pulsed UV radiation for about 2 to 6 seconds, or about 4 seconds.

Aspect 13. The method of any of aspects 1-12, wherein the mask comprises a material impenetrable to UV light.

Aspect 14. The method of any of aspects 1-13, wherein the first stimulus is selected from a vertical force and capillary pressure, wherein the capillary pressure is generated by evaporation of water from the voids.

Aspect 15. A method of revealing a hidden anti-counterfeiting pattern comprising: contacting a chromogenic sensor with a trigger solvent, causing the chromogenic sensor to reveal the hidden anti-counterfeiting pattern; wherein the chromogenic sensor comprises a porous polymer material comprising an ordered array of voids separated by a polymer framework, wherein the porous polymer material has a first region having the hidden anti-counterfeiting pattern and a second region; wherein the first region of the porous polymer material has a deformed state and a recovered state, wherein when in the deformed state, the voids are collapsed and the first region has a characteristic of being substantially transparent, wherein when the first region of the porous polymer material is in the recovered state, the voids are uncollapsed and the first region has a characteristic of having an iridescent color; wherein the second region has been exposed to UV radiation during a programming step, thereby causing the voids of the second region to irreversibly remain in a collapsed state and has a characteristic of remaining transparent; wherein the hidden anti-counterfeiting pattern is not visible when the first region is in a deformed state since both the first and second regions have the characteristic of being substantially transparent; and wherein the contacting occurs when the first region is in a deformed state, and contacting causes the first region of the porous polymer material to return to the recovered state thereby revealing the anti-counterfeiting pattern.

Aspect 16. The method of aspect 15, further comprising concealing the anti-counterfeiting pattern by exposing the material to water, thereby returning the first region to the deformed state.

Aspect 17. The method of any of aspects 15 or 16, wherein the trigger solvent is selected from hexane, acetone, ethanol, toluene, or vapors thereof.

Aspect 18. The method of any of aspects 15-17, wherein the chromogenic sensor is attached to an article or article packaging.

Aspect 19. A porous polymer material comprising a shape memory polymeric material comprising ordered voids; wherein the porous polymer material has a first region having a deformed state and a recovery state, wherein the recovery state is activated by a trigger solvent and the deformed state is activated by water; and wherein the porous polymer material has a second region, wherein the second region has a been programmed to remain in the deformed state when exposed to the trigger solvent.

Aspect 20. The porous polymer material of aspect 19, wherein when in the deformed state, the first region has a characteristic of appearing transparent and when in the recovered state, the first region has a characteristic of having an iridescent color.

Aspect 21. The porous polymer material of any of aspects 19-20, wherein the porous polymer material has a thickness of about 1 micrometer to 300 micrometers.

Aspect 22. A chromogenic sensor having a hidden anti-counterfeiting pattern comprising: a porous polymer material comprising an ordered array of voids separated by a polymer framework, wherein the porous polymer material has a first region having the hidden anti-counterfeiting pattern and a second region; wherein the first region of the porous polymer material has a deformed state and a recovered state, wherein when the first region is in the deformed state, the voids are collapsed and the first region has a characteristic of being substantially transparent, wherein when the first region is in the recovered state, the voids are uncollapsed and the first region has a characteristic of having an iridescent color; wherein the second region has been exposed to a programming step, thereby causing the voids of the second region to irreversibly remain in a collapsed state and wherein the second region has a characteristic of remaining transparent; wherein the hidden anti-counterfeiting pattern is not visible when the first region is in a deformed state since both the first and second regions have the characteristic of being substantially transparent; and wherein when the first region is in a deformed state, contacting the chromogenic sensor with a trigger solvent causes the first region of the porous polymer material to be in the recovery state thereby revealing the anti-counterfeiting pattern.

Aspect 23. The chromogenic sensor of aspect 22, wherein rinsing the chromogenic sensor with water causes the first region to return to the deformed state, thereby hiding the anti-counterfeiting pattern.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. A chromogenic sensor having a hidden anti-counterfeiting pattern comprising:
   a porous polymer material comprising an ordered array of voids separated by a polymer framework,
   wherein the porous polymer material has a first region having the hidden anti-counterfeiting pattern and a second region; wherein the first region of the porous polymer material has a deformed state and a recovered state,
   wherein when the first region is in the deformed state, the voids are collapsed and the first region has a characteristic of being transparent, wherein when the first region is in the recovered state, the voids are uncollapsed and the first region has a characteristic of having an iridescent color;
   wherein the second region has been exposed to a programming step, thereby causing the voids of the second region to irreversibly remain in a collapsed state and wherein the second region has a characteristic of remaining transparent;
   wherein the hidden anti-counterfeiting pattern is not visible when the first region is in a deformed state since both the first and second regions have the characteristic of being transparent; and
   wherein when the first region is in a deformed state, contacting the chromogenic sensor with a trigger solvent causes the first region of the porous polymer material to be in the recovery state thereby revealing the anti-counterfeiting pattern.

2. The chromogenic sensor of claim 1, wherein rinsing the chromogenic sensor with water causes the first region to return to the deformed state, thereby hiding the anti-counterfeiting pattern.

3. The chromogenic sensor of claim 1, wherein all of the voids in the first region have substantially the same diameter.

4. The chromogenic sensor of claim 3, wherein the diameter of each void is about 0.03 micrometers to 10 micrometers.

5. The chromogenic sensor of claim 4, wherein the porous polymer material has a thickness of about 1 micrometer to 1000 micrometers.

6. The chromogenic sensor of claim 1, wherein the trigger solvent is selected from hexane, acetone, ethanol, toluene, or vapors thereof.

7. The chromogenic sensor of claim 1, wherein the chromogenic sensor is attached to an article or article packaging.

8. The chromogenic sensor of claim 1, wherein the polymer framework is a polymer produced by the reaction of: a blend of ethoxylated trimethylolpropane triacrylate and polyethylene glycol diacrylate, a blend of an aliphatic polyester/polyether-based trifunctional urethane acrylate oligomer and blended with tripropylene glycol diacrylate, or a combination thereof.

* * * * *